United States Patent

Stelzer et al.

[11] Patent Number: 5,969,854
[45] Date of Patent: Oct. 19, 1999

[54] CONFOCAL MICROSCOPE WITH DOUBLE-OBJECTIVE SYSTEM

[75] Inventors: Ernst H. K. Stelzer, Meckesheim; Steffen Lindek, Plankstadt, both of Germany

[73] Assignee: Carl Zeiss Jena GmbH, Jena, Germany

[21] Appl. No.: 09/043,624

[22] PCT Filed: Jul. 22, 1997

[86] PCT No.: PCT/EP97/03954

§ 371 Date: May 21, 1998

§ 102(e) Date: May 21, 1998

[87] PCT Pub. No.: WO98/03892

PCT Pub. Date: Jan. 29, 1998

[30] Foreign Application Priority Data

Jul. 23, 1996 [DE] Germany ............... 196 29 725

[51] Int. Cl.⁶ .................................................. G02B 21/06
[52] U.S. Cl. .......................................... 359/385; 359/368
[58] Field of Search ............... 359/363, 368, 359/373–378, 385–390; 351/205–217, 243

[56] References Cited

U.S. PATENT DOCUMENTS

| | | |
|---|---|---|
| 3,517,980 | 6/1970 | Petran et al. .................. 359/368 |
| 5,132,837 | 7/1992 | Kitajima ........................ 359/374 |

FOREIGN PATENT DOCUMENTS

| | | | |
|---|---|---|---|
| 4326473 | 2/1985 | Germany | 359/385 |
| 3427592 | 2/1986 | Germany | 359/385 |
| 9408066 U | 11/1994 | Germany . | |
| 111508 | 7/1982 | Japan | 359/385 |
| 198007 | 6/1967 | Russian Federation | 359/389 |
| WO 92/00540 | 1/1992 | WIPO | 359/389 |

*Primary Examiner*—Thong Nguyen
*Attorney, Agent, or Firm*—McAulay Nissen Goldberg Kiel & Hand, LLP

[57] ABSTRACT

A double-objective system for a microscope, wherein an objective is provided for focusing object illumination light onto an object point and an objective is provided for collecting light that proceeds from the object point. The optical axes of the two objectives are inclined relative to one another, so that the observation direction and the illumination direction are at an angle relative to one another. The two objectives are combined at a shared holder to form a double-objective constructional unit for guiding light from an object illumination source through a light passage opening, wherein, further, a light deflection system is provided, which shapes the illumination beam path and/or the observation beam path in such a way that the observation light coming from the observation objective exits the double-objective constructional unit through the light passage opening. The double-objective constructional unit can therefore be used in a conventional microscope construction.

12 Claims, 1 Drawing Sheet

CONFOCAL MICROSCOPE WITH DOUBLE-OBJECTIVE SYSTEM

BACKGROUND OF THE INVENTION a) Field of the Invention

The invention is directed to a confocal microscope with a double-objective system comprising a first objective, which is provided for focussing light from an object illumination source onto an object point in an illumination beam path, and a second objective which is provided for collecting light that proceeds from the object point in an observation beam path, wherein the observation direction of the second objective is at an angle to the illumination direction of the first objective.

b) Description of the Related Art

A scanning microscope with a dual-objective system of the type mentioned above is known from DE 43 26 473 A1. In this known scanning microscope, collimated laser light is focussed through the first objective in the illumination beam path onto an object point. The second objective is arranged relative to the first objective in such a way that the optical axes of the two objectives are perpendicular to one another and the object point illuminated by the first objective lies in the principal focus of the second objective, so that the observation direction of the second objective is at a right angle to the illumination direction of the second objective. The observation light proceeding from the object point and collected by the second objective is focussed onto a pinhole diaphragm by a lens arranged following the second objective in the observation beam path, wherein a light detector measures the intensity of the light passing through the pinhole diaphragm. A corresponding image can then be generated from the measurement information of the light detector by scanning an object area.

Further, an incident illumination for stereo microscopes known from DE 94 08 066 U1 illuminates the object to be observed from the direction of the observation optics as far as possible. It is realized in such a way that the illumination arrangement forms a constructional unit with the microscope body and accordingly with the microscope objective acting as detector arrangement.

This illumination arrangement differs from the double-objective system according to the invention in particular in that it is not suitable for use in a confocal microscope and in that it illuminates as far as possible from the detection direction, whereas in the double-objective system according to the invention a right angle is realized as far as possible between the illumination direction and the detection direction.

The scanning microscope known from DE 43 26 473 A1 already has an extremely high resolution. This is achieved in particular in that the confocal volume detected in the in-focus or focal range is minimized due to the intersection of the optical axes of the illumination beam path and observation beam path at a right angle in the object point. When the illumination volume in the object area is considered in a rough approximation as an ellipsoid stretched along the illumination axis and the observation volume of the second objective in the object area is considered as an ellipsoid stretched along the optical axis of the second objective, a superposition of these ellipsoids in the focal range or in the object point region gives a correspondingly smaller confocal volume which substantially corresponds to the intersection volume of the illumination volume and observation volume. The smaller the confocal volume considered in this way, the better the resolution of the microscope.

An analogous manner of considering assumes that the intensity distribution of the object illumination light in the focal range of the first objective is described by the illumination point spread function, as it is called, and that the detection probability for the light proceeding from the focal range by means of the second objective when using a detection pinhole is described by the observation (detection) point spread function.

The resulting confocal point spread function KPVF of a confocal microscope is the product of the illumination point spread function and the observation point spread function. The more extensive the KPVF, the poorer the resolution of the microscope. As a result of the now virtually perpendicular arrangement of the illumination point spread function and the observation point spread function relative to one another, the comparatively large expanse of the illumination point spread function along the optical axis of the first objective is compensated by the small expanse of the illumination point spread function along this axis, so that an approximately equally good resolution is achieved along all three spatial axes. Therefore, a very good resolution capacity is achieved because of the illumination and observation beam paths which intersect at a right angle in the object point.

According to DE 43 26 473 A1, a special construction with complete separation of the observation beam path from the illumination beam path is provided for realizing the beam paths for illumination and observation which intersect in the object point. A special construction of this type requires a comparatively large amount of room in the two directions of the beam paths for illumination and observation at right angles to one another and is accordingly more difficult to manage than conventional scanning microscopes in which the illumination beam path and the observation beam path coincide and the focussing of the object illumination light and the collection of the observation light coming from the object point are effected through the same objective.

OBJECT AND SUMMARY OF THE INVENTION

It is an object of the present invention to achieve the foregoing stated objects by an optical light microscope without deviating from previous construction designs.

In accordance with the present invention, a double-objective system for a microscope includes a first objective which is provided for focussing light of an object illumination source onto an object point in an illumination beam path, and a second objective which is provided for collecting light that proceeds from the object point in an observation beam path. The observation direction of the second objective is at an angle ($\alpha$) to the illumination direction of the first objective. The two objectives are attached to a shared holder so as to form a double-objective constructional unit containing both objectives, the double-objective constructional unit contains a light passage opening for guiding light from the object illumination source and further contains a light deflection system for shaping at least one of the illumination beam path and the observation beam path so that observation light coming from the second objective exits the double-objective constructional unit through the light passage opening.

An embodiment example of the invention is explained more fully hereinafter with reference to the drawing.

DESCRIPTION OF THE PREFERRED EMBODIMENTS

Figure 1:
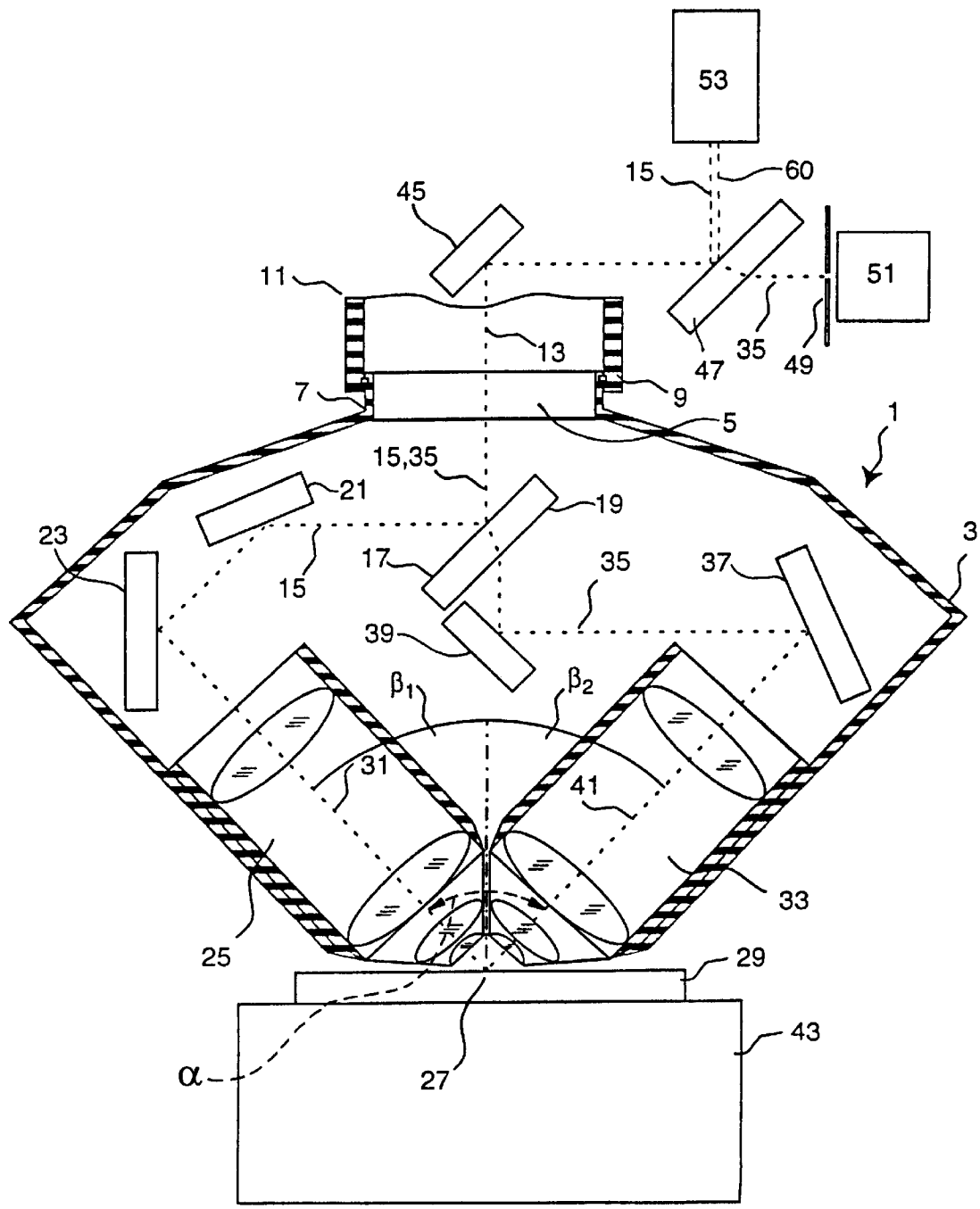
FIG. 1 shows a schematic sectional view of an embodiment example of a double-objective system according to the invention.

The present invention, in accordance with its object, indicates a method such as the optical principle known from DE 43 26 473 A1 which is applicable in an optical light microscope without deviating from the construction design of a conventional microscope.

For this purpose, it is suggested, according to the invention, that the two objectives are attached to a common holder so as to form a cohesive component group or constructional unit containing both objectives, wherein the double-objective constructional unit contains a light passage opening for guiding light from an object illumination source and further contains a light deflection system which shapes the illumination beam path and/or the observation beam path in such a way that the observation light coming from the second objective exits the double-objective constructional unit through the light passage opening.

Since the light enters and exits through a common light passage opening, the double-objective system, according to the invention, can be used as an objective system which is compatible with the beam path for a microscope, in particular a scanning microscope, which is configured in a conventional manner in other respects and is designed for illumination and observation through the same objective, wherein, in the conventional microscope, it can be substituted for the conventional individual objective.

Therefore, the optical principle known from DE 43 26 473 A1 for achieving an extremely high resolution in all three spatial directions can be realized in combination with a conventional microscope construction.

The two objectives and the light deflection system are preferably accommodated in a common housing which has an opening for the introduction of light of an object illumination source and for guiding out the observation light.

The housing is preferably attachable to the objective holder of an otherwise conventional microscope, especially so as to be rotatable about the axis of the holder, in order to integrate the illumination beam path of the double-objective constructional unit in the illumination beam path of the microscope and to integrate the observation beam path of the double-objective constructional unit in the observation beam path of the microscope.

With respect to the aimed for high resolution, the angle between the illumination direction of the first objective and the observation direction of the second objective is approximately 90°. However, the advantages of the invention are also still achieved to a sufficient extent if the angle deviates not too substantially from 90°.

The terms illumination direction and observation direction refer, respectively, to the direction of the outlet beam path of the first objective and to the direction of the inlet beam path of the second objective.

In accordance with a further development of the invention, it can be provided that the objectives are adjustable relative to one another in order to be able to selectively change the angle between the illumination direction and observation direction. For example, if the angle is set at somewhat less than 90°, the specimen space in front of the double-objective constructional unit is less narrowly restricted without making great compromises with respect to the desired resolution.

The objectives preferably have the same numerical aperture, especially a large numerical aperture, and can have conventional lens elements. The objectives should preferably have a long working distance.

In order to reduce the angle between the optical axes of the two objectives, lens elements of the objectives can be ground. The field of view of the individual objectives is accordingly no longer round. However, when the double-objective system is used in a scanning microscope with beam scanning, this has no influence on the imaging characteristics, since, in each case, the beam is scanned in only one dimension which then extends perpendicular to the optical axes of the objectives.

Further, the fact that the double-objective constructional unit according to the invention can be used in a conventional scanning microscope construction results in the substantial advantage that the beam movement means and object movement means required for scanning (beam scanning and/or object scanning) can also be of conventional design and need not be specially adapted. The beam scanning is usually carried out vertical to the optical axes of the two objectives. In this way, it is ensured in the case of beam scanning that the illumination point and observation point are moved jointly.

The double-objective constructional unit according to the invention advantageously allows the use of an immersion medium when used in a scanning microscope.

The light deflection system of the double-objective constructional unit can contain mirrors, dichroic mirrors, beam splitters or optical fibers (60 in FIG. 1), for example.

At least some optical elements of the light deflection system are preferably fastened in the housing so as to be movable for adjustment purposes and/or exchangeable, as needed. This is also true for the objectives.

The double-objective constructional unit according to the invention can be handled in a simple manner essentially like a conventional objective in a conventional microscope and can be used in a fluorescence microscope in which the fluorescence dyes are excited by single-photon or multi-photon absorption. For observation of fluorescent light, suitable optical elements affecting the wavelength of the light can be provided. Optical elements of this kind, for example, spectral filters, can be used in the beam paths for illumination and observation which extend separately within the double-objective constructional unit. On the other hand, elements of this kind can also be introduced at a location at which the beam paths run together.

Alternatively, the double-objective constructional unit according to the invention can also be used in a microscope which operates by scattered light. For observation of scattered light, suitable optical elements affecting the polarization direction of the light can be provided.

Polarizers of the type mentioned above can be used, for example, in the beam paths for illumination and observation which extend separately in the double-objective constructional unit. However, as an alternative, it is also possible to use them at a location at which the two beam paths run together.

The double-objective system according to the invention can be constructed in such a way that illumination and observation can be exchanged with respect to the two beam paths mentioned above. A further possibility consists in that only one or the other beam path, as needed, can be used in a conventional manner simultaneously as illumination beam path and observation beam path, for example, in order to carry out visual observation of the object point by means of an eyepiece system.

Referring now to the drawing, the double-objective system of FIG. 1 is shown as a cohesive structural component group 1 (double-objective constructional unit) which can be handled as a unit. The double-objective constructional unit 1 has a housing 3 with a light passage opening 5 which is enclosed by a mounting or frame 7. The frame 7 of the double-objective constructional unit 1 is to be connected to the objective holder 9, indicated schematically, of a microscope 11. The light path, indicated in dashed lines, passes within objective holder 9 and frame 7, and the light passage opening 5 is centered with respect to the optical tube axis 13, wherein the double-objective constructional unit 1 is optionally rotatable about the optical axis 13.

The double-objective constructional unit 1 has an illumination beam path 15 which forms part of the overall illumination beam path of the microscope 11. As in a reflected light microscope, the light coming from an object illumination source 53 of the microscope 11 via a beam splitter 47 and mirror 45 enters the objective system 1 along the optical axis 13 through the opening 5. The object illumination light is then reflected laterally at the surface 17 of the beam splitter 19 of a light deflection system arranged in the housing 3 and strikes the deflecting mirrors 21 and 23 in succession, so that the light reflected by the deflecting mirror 23 finally enters the illumination beam path 15 through a first objective 25. The first objective 25 serves to focus the light from the object illumination source onto an object point 27 of an object resting on an object carrier 29.

As can be seen from FIG. 1, the optical axis 31 of the first objective 25 is inclined at an angle $\beta_1$ relative to the optical tube axis 13 of the microscope 11.

In order to observe the object point 27, the double-objective constructional unit 1 has a second objective 33 in the housing 3, which second objective 33 is arranged in the observation beam path 35 and collects light coming from the object point 27. A deflecting mirror 37 is provided at the light outlet side of the second objective 33, which deflecting mirror 37 reflects the observation light collected by the second objective 33 laterally to an additional deflecting mirror 39. The observation light reflected by the deflecting mirror 39 then passes through the beam splitter 19 with a small offset and finally passes along the optical axis 13 through the opening 5 via mirror 45 and beam splitter 47 to an observation system (not shown) or to the detector 51, shown in the drawing, with a pinhole diaphragm 49 of a light detection system of the microscope 11, which pinhole diaphragm 49 is arranged in front of the detector 51.

The optical axis 41 of the second objective 33 is inclined at an angle $\beta_2$ relative to the optical axis 13, wherein the angle $\beta_2$ is preferably equal to the opposite angle $\beta_1$.

The optical axes 31 and 41 of the two objectives 25 and 33 enclose an angle α which is somewhat less than 90° in the example shown in FIG. 1, but which can also be exactly 90° in an alternative embodiment form.

By arranging the observation objective 33 relative to the illumination objective 25 in the manner mentioned above, the double-objective constructional unit 1 according to the invention achieves the advantages of extremely high resolution as in the scanning microscope according to DE-OS 43 26 473, and it is possible to make recordings with the highest resolution that a far-field light microscope can have without the use of interference. Further, the double-objective constructional unit 1 according to the invention can be used in a conventional scanning microscope which has a common beam path for illumination and observation at the point of intersection with the objective by means of a conventional objective, since the illumination beam path and the observation beam path of the double-objective constructional unit 1 converge essentially along the axis 13 in the area of the light passage opening 5 and accordingly in the area of connection to the conventional microscope, so that the double-objective constructional unit 1 according to the invention has a connection compatibility with respect to the illumination beam path and observation beam path of the conventional microscope construction.

Since the two objectives 25 and 33 and the light deflection system 19, 21, 23, 37, 39 are accommodated in a common housing 3, the double-objective constructional unit 1 according to the invention can be handled essentially as a conventional individual objective in a conventional scanning microscope. The double-objective constructional unit 1 can preferably be attached to the microscope construction 11 so as to be removable, so that it can be exchanged for another objective, if required, for example, a conventional individual objective.

The objectives 25 and 33 preferably comprise conventional objective lenses. In particular, the objectives 25 and 33 have the same construction and the same numerical aperture, wherein the numerical aperture should be as large as possible, and wherein the objectives 25 and 33 should preferably have a long working distance and a small field of view.

In the embodiment example according to FIG. 1, the optical elements in the illumination beam path 35 (especially the deflecting mirrors 37 and 39) are arranged so as to be stationary with respect to the housing 3, so that the observation point can be fixed and can serve as a reference for the adjustment of the illumination point. In this case, the adjustment of the illumination beam path requires five degrees of freedom which can be made available, for example, by the deflecting mirrors 21 and 23 with two degrees of freedom, respectively, and by the objective 25 with one degree of freedom.

An object carrier stage which is movable in a controlled manner by means of a scanning control and which enables object scanning through controlled movement of the object relative to the microscope is designated in FIG. 1 by 43. The object carrier stage 43 can preferably carry out translational movements and rotational movements in that it is controlled by the scanning control.

The double-objective constructional unit 1 according to the invention can also be used in a microscope with beam scanning in which a scanning unit (not shown) of the conventional microscope 11 moves the common illumination and observation beam path in such a way that the illumination point and the observation point are moved relative to the object under controlled conditions, which results in a substantial advantage with respect to speed. The object scanning and beam scanning operation modes can also be combined if required.

While the foregoing description and drawings represent the present invention, it will be obvious to those skilled in the art that various changes may be made therein without departing from the true spirit and scope of the present invention.

What is claimed is:

1. A double-objective system for a microscope, comprising:
    a first objective which is provided for focussing light of an object illumination source onto an object point in an illumination beam path;
    a second objective which is provided for collecting light that proceeds from the object point in an observation beam path, an observation direction of the second objective being at an angle (α) to an illumination direction of the first objective;

said two objectives being attached to a shared holder so as to form a double-objective constructional unit containing both objectives;

said double-objective constructional unit containing a light passage opening for guiding light from said object illumination source and further containing a light deflection system for shaping at least one of the illumination beam path and the observation beam path so that observation light coming from the second objective exits the double-objective constructional unit through the light passage opening.

2. The double-objective system according to claim 1, wherein the shared holder has a housing which contains the two objectives and the light deflection system and has a housing opening forming the light passage opening.

3. The double-objective system according to claim 2, wherein the housing is rotatable attached to an objective holder of a microscope, aid housing being rotatable about an axis of the objective holder, in order to integrate the illumination beam path of the double-objective constructional unit in an illumination beam path of the microscope and in order to integrate the observation beam path of the double-objective constructional unit in an observation beam path of the microscope.

4. The double-objective system according to claim 1, wherein the angle ($\alpha$) between the illumination direction of the first objective and the observation direction of the second objective is approximately 90°.

5. The double-objective system according to claim 1, wherein at least one of the first objective and the second objective is held so as to be movable for selectively changing the angle ($\alpha$) between the illumination direction and the observation direction.

6. The double-objective system according to claim 1, wherein an optical axis of the first objective extends at a first angle of inclination ($\beta_1$) relative to an axis of the light passage opening, and wherein light deflecting elements of the light deflection system are provided on a light inlet side of the first objective, which light deflecting elements deflect light of the object illumination source incident along the axis of the light passage opening for passage through the first objective.

7. The double-objective system according to claim 1, wherein an optical axis of the second objective extends at an angle of inclination ($\beta_2$) relative to an axis of the light passage opening, and wherein light deflecting elements of the light deflection system are provided on a light outlet side of the second objective, which light deflecting elements deflect observation light coming from the second objective, so that the observation light exits the double-objective constructional unit along the axis of the light passage opening.

8. The double-objective system according to claim 1, wherein the light deflection system contains optical light-conducting fibers.

9. The double-objective system according to claim 1, wherein the two objectives have substantially the same numerical aperture.

10. Microscope with a double-objective system, comprising:

a first objective which is provided for focussing light of an object illumination source onto an object point in an illumination beam path;

a second objective which is provided for collecting light that proceeds from the object point in an observation beam path, an observation direction of the second objective being at an angle ($\alpha$) to an illumination direction of the first objective;

said two objectives being attached to a shared holder so as to form a double-objective constructional unit containing both objectives;

said double-objective constructional unit containing a light passage opening for guiding light from said object illumination source and further containing a light deflection system for shaping at least one of the illumination beam path and the observation beam path so that observation light coming from the second objective exits the double-objective constructional unit through the light passage opening.

11. The microscope according to claim 10, wherein said microscope is a fluorescence microscope.

12. An arrangement for the observation of scattered and/or reflected light, comprising:

a microscope having:

a first objective which is provided for focussing light of an object illumination source onto an object point in an illumination beam path;

a second objective which is provided for collecting light that proceeds from the object point in an observation beam path, an observation direction of the second objective being at an angle ($\alpha$) to an illumination direction of the first objective;

said two objectives being attached to a shared holder so as to form a double-objective constructional unit containing both objectives;

said double-objective constructional unit containing a light passage opening for guiding light from said object illumination source and further containing a light deflection system for shaping at least one of the illumination beam path and the observation beam path so that observation light coming from the second objective exits the double-objective constructional unit through the light passage opening, said arrangement being adapted to observe scattered and/or reflected light.

* * * * *